(12) United States Patent
Nance et al.

(10) Patent No.: US 10,303,837 B2
(45) Date of Patent: *May 28, 2019

(54) VIRTUAL CELL MODEL GEOMETRY COMPRESSION

(71) Applicant: Synopsys, Inc., Mountain View, CA (US)

(72) Inventors: James Lewis Nance, Raleigh, NC (US); Jun Chen, Cary, NC (US); Gary B. Nifong, Durham, NC (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,565

(22) Filed: Jul. 19, 2017

(65) Prior Publication Data

US 2018/0129772 A1 May 10, 2018

Related U.S. Application Data

(63) Continuation of application No. 14/673,709, filed on Mar. 30, 2015, now Pat. No. 9,740,812.

(60) Provisional application No. 62/002,808, filed on May 24, 2014, provisional application No. 62/006,069, filed on May 31, 2014, provisional application No. 62/006,657, filed on Jun. 2, 2014, provisional application No. 62/006,083, filed on May 31, 2014, provisional application No. 62/006,607, filed on Jun. 2, 2014, provisional application No. 62/006,092, filed on May 31, 2014.

(51) Int. Cl.
*G06F 17/50* (2006.01)

(52) U.S. Cl.
CPC ......... *G06F 17/5072* (2013.01); *G06F 17/50* (2013.01); *G06F 17/5009* (2013.01); *G06F 17/5081* (2013.01); *G06F 17/5068* (2013.01); *G06F 2217/12* (2013.01); *Y02P 90/265* (2015.11)

(58) Field of Classification Search
CPC ............ G06F 17/5081; G06F 17/5072; G06F 17/5009; G06F 2217/12
USPC ............................... 716/112, 52, 54, 55, 106
See application file for complete search history.

(56) References Cited

U.S. PATENT DOCUMENTS

| | | |
|---|---|---|
| 5,281,558 A | 1/1994 | Bamji et al. |
| 5,309,371 A | 5/1994 | Shikata et al. |

(Continued)

OTHER PUBLICATIONS

U.S. Appl. No. 61/931,571, filed Jan. 25, 2014, Expired.

(Continued)

*Primary Examiner* — Phallaka Kik
(74) *Attorney, Agent, or Firm* — Alston & Bird LLP

(57) ABSTRACT

Semiconductor designs are large and complex, typically consisting of numerous circuits called cells. To handle complexity, hierarchical structures are imposed on the semiconductor design to help accomplish analysis, simulation, verification, and so on. The hierarchical structures define architecture, behavior, function, structure, etc. of the semiconductor design. Virtual cells are constructed to compress cell geometries and ease the various design tasks. A cell and multiple instances of the cell are identified within the semiconductor design and the virtual hierarchical levels describing the design. Virtual hierarchical layer (VHL) data based on the cell is loaded. A virtual cell model representative of the cell is obtained. Interactions between cell data and VHL data are determined, and relevant portions of shapes are selected. Data within the virtual cell model is reduced based on the determined interactions.

20 Claims, 12 Drawing Sheets

(56) References Cited

U.S. PATENT DOCUMENTS

| | | | |
|---|---|---|---|
| 5,493,510 | A | 2/1996 | Shikata |
| 5,528,508 | A | 6/1996 | Russell et al. |
| 5,559,718 | A | 9/1996 | Baisuck et al. |
| 5,581,475 | A | 12/1996 | Majors |
| 6,009,250 | A | 12/1999 | Ho et al. |
| 6,009,251 | A | 12/1999 | Ho et al. |
| 6,011,911 | A | 1/2000 | Ho et al. |
| 6,035,113 | A | 3/2000 | Gerber et al. |
| 6,047,116 | A | 4/2000 | Murakami et al. |
| 6,275,971 | B1 | 8/2001 | Levy et al. |
| 6,289,412 | B1 | 9/2001 | Yuan et al. |
| 6,363,516 | B1 | 3/2002 | Cano et al. |
| 6,543,039 | B1 | 4/2003 | Watanabe |
| 6,629,304 | B1 | 9/2003 | Gasanov et al. |
| 6,730,463 | B2 | 5/2004 | Heissmeier et al. |
| 6,845,494 | B2 | 1/2005 | Burks et al. |
| 6,886,148 | B2 | 4/2005 | Solomon |
| 6,969,837 | B2 | 11/2005 | Ye |
| 7,103,863 | B2 | 9/2006 | Riepe et al. |
| 7,146,583 | B1 | 12/2006 | Sun et al. |
| 7,149,989 | B2 | 12/2006 | Lakshmanan et al. |
| 7,155,440 | B1 | 12/2006 | Kronmiller et al. |
| 7,415,694 | B2 | 8/2008 | Mayhew |
| 7,418,693 | B1 | 8/2008 | Gennari et al. |
| 7,461,359 | B1 | 12/2008 | Nequist |
| 7,847,937 | B1 | 12/2010 | Bevis |
| 7,873,204 | B2 | 1/2011 | Wihl et al. |
| 7,873,585 | B2 | 1/2011 | Izikson |
| 7,984,395 | B2 | 7/2011 | Cork |
| 8,019,561 | B1 | 9/2011 | Sahrling |
| 8,453,091 | B1 | 5/2013 | Rao et al. |
| 8,539,416 | B1* | 9/2013 | Rossman ............ G06F 17/5081 716/118 |
| 8,799,833 | B2 | 8/2014 | Wann et al. |
| 9,405,879 | B2 | 8/2016 | Wang et al. |
| 9,454,635 | B2 | 9/2016 | Oberai |
| 9,740,811 | B2* | 8/2017 | Chen .................. G06F 17/5072 |
| 9,740,812 | B2* | 8/2017 | Nance ................. G06F 17/5072 |
| 2002/0046392 | A1 | 4/2002 | Ludwig et al. |
| 2003/0163795 | A1 | 8/2003 | Morgan et al. |
| 2003/0229882 | A1 | 12/2003 | Ludwig et al. |
| 2005/0076316 | A1 | 4/2005 | Pierrat et al. |
| 2005/0183053 | A1 | 8/2005 | Ishizuka |
| 2005/0235245 | A1 | 10/2005 | Kotani et al. |
| 2006/0136856 | A1 | 6/2006 | Tang et al. |
| 2008/0046849 | A1 | 2/2008 | Choi |
| 2008/0127016 | A1 | 5/2008 | Ishikawa |
| 2008/0155485 | A1 | 6/2008 | Lin et al. |
| 2008/0244493 | A1 | 10/2008 | Finkler |
| 2009/0089720 | A1 | 4/2009 | Nequist |
| 2009/0210845 | A1 | 8/2009 | Malgioglio et al. |
| 2009/0216450 | A1 | 8/2009 | Sakamoto et al. |
| 2009/0287440 | A1 | 11/2009 | Kulkarni et al. |
| 2009/0310870 | A1 | 12/2009 | Monkowski |
| 2010/0238433 | A1 | 9/2010 | Lange et al. |
| 2010/0251202 | A1 | 9/2010 | Pierrat |
| 2011/0084312 | A1 | 4/2011 | Quandt et al. |
| 2014/0215422 | A1 | 7/2014 | Juneja et al. |
| 2015/0089457 | A1 | 3/2015 | Agarwal et al. |
| 2015/0339426 | A1 | 11/2015 | Nifong et al. |
| 2015/0339430 | A1 | 11/2015 | Nifong et al. |
| 2015/0339432 | A1* | 11/2015 | Nance ................. G06F 17/5072 716/106 |
| 2015/0339433 | A1 | 11/2015 | Nifong et al. |
| 2015/0339434 | A1 | 11/2015 | Nifong et al. |

OTHER PUBLICATIONS

U.S. Appl. No. 62/002,808, filed May 24, 2014, Expired.
U.S. Appl. No. 62/006,069, filed May 31, 2014, Expired.
U.S. Appl. No. 62/006,083, filed May 31, 2014, Expired.
U.S. Appl. No. 62/006,092, filed May 31, 2014, Expired.
U.S. Appl. No. 62/006,657, filed Jun. 2, 2014, Expired.
U.S. Appl. No. 62/006,607, filed Jun. 2, 2014, Expired.
U.S. Appl. No. 15/654,565, filed Jul. 19, 2017, Pending.
U.S. Appl. No. 15/654,511, filed Jul. 19, 2017, Pending.
"Virtual Layer Generation During Failure Analysis," U.S. Appl. No. 14/604,694, filed Jan. 24, 2015, Synopsys Inc.
U.S. Appl. No. 14/604,694, Non-Final Office Action dated Nov. 19, 2015.
U.S. Appl. No. 14/604,694, Notice of Allowance dated Jun. 2, 2016.
U.S. Appl. No. 14/634,695, Final Office Action dated Dec. 14, 2016.
U.S. Appl. No. 14/634,695, Non-Final Office Action dated Jul. 1, 2016.
U.S. Appl. No. 14/634,695, Non-Final Office Action dated Jul. 14, 2017.
U.S. Appl. No. 14/673,064, Final Office Action dated Sep. 26, 2016.
U.S. Appl. No. 14/673,064, Non-Final Office Action dated Jun. 8, 2016.
U.S. Appl. No. 14/673,064, Notice of Allowance dated Mar. 8, 2017.
U.S. Appl. No. 14/673,064, Notice of Allowance dated Apr. 26, 2017.
U.S. Appl. No. 14/673,064, Notice of Allowance dated Nov. 14, 2016.
U.S. Appl. No. 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Mar. 2, 2017.
U.S. Appl. No. 14/673,709, Notice of Allowance dated Apr. 12, 2017.
U.S. Appl. No. 14/673,709, Notice of Allowance dated Nov. 8, 2016.
U.S. Appl. No. 14/713,488, Non-Final Office Action dated Mar. 2, 2017.
U.S. Appl. No. 14/713,716, Final Office Action dated Jan. 9, 2017.
U.S. Appl. No. 14/713,716, Non-Final Office Action dated Aug. 10, 2017.
U.S. Appl. No. 14/713,716, Non-Final Office Action dated Aug. 11, 2016.
U.S. Appl. No. 14/719,996, Non-Final Office Action dated Aug. 26, 2016.
U.S. Appl. No. 14/719,996, Notice of Allowance dated Mar. 15, 2017.
U.S. Appl. No. 14/719,996, Notice of Allowance dated Jun. 5, 2017.
U.S. Appl. No. 14/719,996, Notice of Allowance dated Nov. 16, 2016.
U.S. Appl. No. 14/713,488, Notice of Allowance dated Oct. 30, 2017.
U.S. Appl. No. 14/719,996, Notice of Allowance dated Sep. 22, 2017.
U.S. Appl. No. 14/634,695, Final Office Action dated Apr. 12, 2018.
U.S. Appl. No. 14/713,716, Final Office Action dated Apr. 13, 2018.
U.S. Appl. No. 15/654,511, Non-Final Office Action dated Apr. 10, 2018.
U.S. Appl. No. 14/634,695, Non-Final Office Action dated Nov. 14, 2018.
U.S. Appl. No. 14/713,716, Non-Final Office Action dated Nov. 2, 2018.
U.S. Appl. No. 15/654,511, Notice of Allowance dated Jan. 23, 2019.

* cited by examiner

VIRTUAL CELL MODEL GEOMETRY COMPRESSION

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. Each of the foregoing applications are hereby incorporated by reference in their entirety.

FIELD OF ART

This application relates generally to semiconductor circuit design and more particularly to physical verification of semiconductor designs using Design Rule Checking (DRC).

BACKGROUND

Electronic products rely on integrated circuits (ICs) which can contain many millions or even billons of transistors and other electronic structures such as resistors, capacitors, diodes, and interconnecting conductors. The design process for modern ICs involves many different steps to help manage the complexity and produce an IC that functions as intended. One of the design steps involves implementing a physical verification process, which is typically highly automated. The physical verification process for an integrated circuit (IC) is a design step taken by semiconductor manufacturers before commencing the fabrication of an IC. Physical verification involves implementing sets of checks on a design to ensure that physical structures on a chip behave in a predictable and acceptable manner in accordance with a design's intent. To perform physical verification, semiconductor foundries first define a set of so-called design rules for manufacturing (DRM) for IC designers to follow. The DRM outline a set of geometric relationships between manufacturing layers and features in a design layout, layers which in turn are used to create an IC. The defining of DRM allows a set of known good parameters for a design to be compared with the actual physical design layout, which can include hundreds of layers used during the fabrication process to create transistors and electrical interconnect in the IC. If the design violates the DRM in a certain location, the location represents a potential issue or failing requiring attention before manufacturing can commence. The semiconductor process has grown in complexity such that a physical design layout must adhere to thousands of design rules before a design can be successfully fabricated and produce a high yield during the fabrication process.

Use of a design rule checking (DRC) physical verification tool is an industry standard process for implementing the semiconductor's DRM. While the DRM itself can define many different parameters, such as width, spacing, angle, enclosure, density and electrical connectivity rules for design layers, the parameters are translated into a DRC runset—a set of DRC operations that verify the required DRM rules—before actual verification can commence. A DRC tool provides a large set of DRC commands from which a designer draws in order to build a specialized sequence of commands to verify and satisfy each DRM rule for a design. This is not a simple task. DRM rules commonly result in a DRC runset with 20,000 or more DRC commands for technology nodes smaller than 28 nanometers (nm). Modern DRC physical verification tools have a large suite of geometric and electrical commands to effectively implement the complex DRM rules. However, many of the geometric and electrical DRC commands result in the implementation of unique algorithms that are not shared between individual commands, thus resulting in a very complex DRC tool requiring the implementation of numerous algorithms to complete the DRM checking.

Large ICs are typically built using a hierarchical method that begins with the creation of small child cells which are combined into larger parent cells, which then are successively used to build larger and larger cells to create an IC hierarchical design. Physical verification tools take advantage of the hierarchy in a design to efficiently process today's extremely large designs. Various forms of data-integrating processes may offer an alternative to the numerous algorithms required hierarchical processing, but these processes often result in data flattening, and thus cause very large increases in processing time, an infeasible tradeoff for modern design verification.

SUMMARY

Virtual cell model geometry compression is used to reduce the size of virtual hierarchical layer (VHL) data structures, and related data structures such as context data, which is used for physical verification of an integrated circuit design. A geometric shape in the VHL is simplified by reducing the number of corners it contains. Reducing the number of corners of a geometric shape can add or subtract from the area of that geometric shape, but the reducing is done by determining interactions between data within the cell and the VHL data, and selecting relevant portions of the geometric shapes to add or subtract based on that. These techniques maintain the correctness of the VHL in representing the cell for the physical verification process.

A computer-implemented method for design analysis is disclosed comprising: identifying a cell and multiple instances of the cell from a semiconductor design including a plurality of cells and a plurality of virtual hierarchical levels; loading virtual hierarchical layer (VHL) data based on the cell; obtaining a virtual cell model, representative of the cell; determining interactions, between data within the cell and the VHL data, and selecting relevant portions of shapes based on the determining; and reducing an amount of data within the virtual cell model based on the interactions which were determined. In embodiments, the reducing can include removing shapes which are not part of the relevant portions. The relevant portions of the shapes can interact with polygons in an overlapping cell. In embodiments, the reducing can include removing fake portions of shapes from shapes in the virtual cell model.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
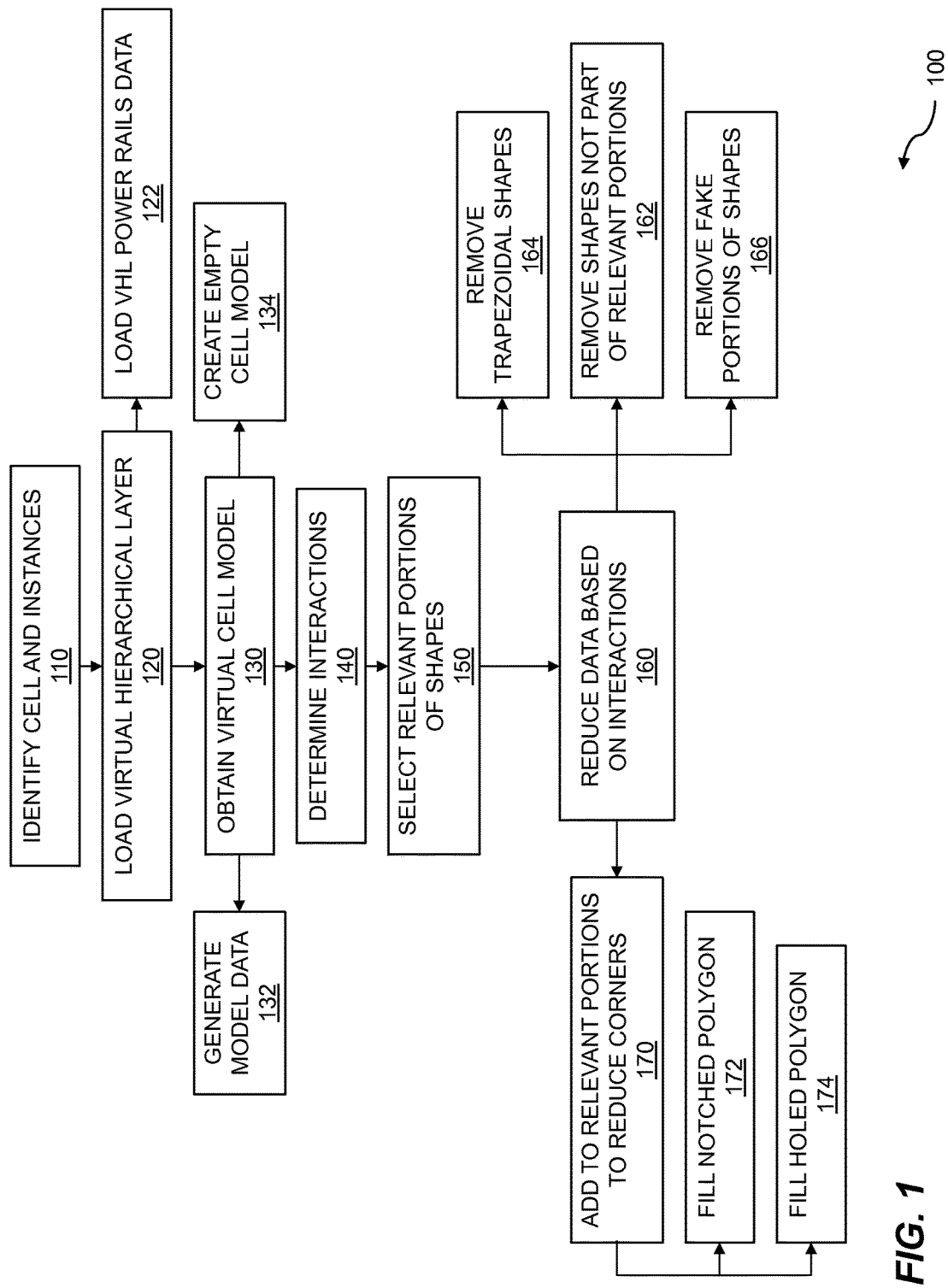
FIG. 1 shows a flow for virtual cell model geometry compression.

Methods, systems, and computer program products are described herein that relate to electronic design automation (EDA) and physical verification of semiconductor designs using a design rule checking (DRC) process defined by a semiconductor foundry. More specifically, optimizations related to virtual cell models known as a virtual hierarchical layer (VHL) are described. Embodiments of the present disclosure use a variety of techniques, including, but not limited to, removing area and adding area to the geometric shapes of the VHL to reduce the number of corners in the geometric shapes and thereby reduce the size of the data needed to describe those shapes. The corner reduction effectively acts as a compression of the VHL data, reducing the size of the VHL, which in turn can reduce the memory footprint and computational resources required for the DRC process.

Hierarchical physical verification of an integrated circuit (IC) is a complex process due in part to the multitude of hierarchical design styles that are created by IC design companies and other IC industry tools. The different design styles often result in extremely complex designs many levels deep and containing billions of cells and polygons overlapping each other throughout the design hierarchy. In many verification methods, a hierarchical verification tool collapses any inefficient cell hierarchies and merges duplicate polygons to build a new hierarchy for the tool's individual command algorithms. Once the hierarchical tool builds a new hierarchy, then the layers stored at various levels of the newly-built hierarchy are processed in relation to each other based on the manufacturer-defined design rules and the unique geometric algorithms needed to implement them. As noted above, a design rules for manufacturing (DRM) rule for a certain IC can require verification to be performed by executing a sequence of commands (algorithms) in a design rule checking (DRC) runset, with each algorithm in the sequence cycling through proximal layers in the hierarchy to produce a hierarchical result which then feeds subsequent commands until the DRM rule is satisfied. An algorithm can include many optimizations designed to avoid flattening the algorithm's result (output layer). Without the algorithmic optimizations, hierarchical data flattening can cause the cell data to be forced into increasingly larger chunks, meaning that DRC algorithms lose flexibility and speed in processing the data.

Some hierarchical DRC methods are dependent on having the majority of the IC design layers loaded in memory before beginning the hierarchical algorithmic cycles that perform geometric operations on design data throughout the hierarchy. A hierarchical DRC method that loads an entire design layer has the obvious advantage of having all of the instantiated cell data available in machine memory while cycling the geometric shapes throughout the hierarchy, allowing for reduced algorithm complexity. However, the reduced complexity comes at a cost. The implementation of such a hierarchical algorithm involves cycling design layers through the hierarchy searching for algorithmic interactions of geometric shapes. The hierarchical cycling is typically performed as either single-layer cycling, dual-layer cycling, or for some complex algorithms, N-layer cycling. As the layer count increases for a hierarchical algorithm, so does the memory requirement for the algorithm, which becomes problematic for larger and larger designs. In fact, given the exploding size of modern IC designs, loading an entire design layer requires more memory than is feasible.

In response to the massive memory requirement of loading an entire design layer, several hierarchical DRC methods load only partial layers into memory, a solution which reduces memory requirements for the hierarchical algorithms but increases algorithmic complexity and data loading time, given the limited availability of cell data across the layer. For example, data loading time increases if all the layer data of a cell is not able to be kept in memory and the data must be reloaded every time one of the cell's multiple instantiations interacts with a hierarchical geometric shape being examined. Additionally, reloading the interacting data many times becomes a significant CPU performance issue. For example, if Cell A is instantiated multiple times in a hierarchical design, and Cell A's data has not been preloaded into memory, then every time a hierarchical layer's polygon is cycled through the hierarchy and interacts with an instantiation of Cell A, Cell A's data has to be reloaded dynamically from the disk, resulting in significant CPU I/O. As the alternative method of loading the entire design layer into machine memory has already been mentioned as infeasible given the increasing complexity and decreasing node size of modern semiconductor designs, VHLs are herein presented as an alternative. VHLs eliminate dynamic cell reloading, eliminate the need to load an entire IC design layer into memory, and provide a mechanism for cell-level, bottom-up algorithms for processing hierarchical layers.

As previously noted, current hierarchical DRC methodologies typically exhibit a performance tradeoff between memory consumption and dynamic data load time. The Virtual Hierarchical Layer (VHL) described in US Patent Application "Virtual Hierarchical Layer Usage" Ser. No. 14/634,695 filed Feb. 27, 2015, which is hereby incorporated by reference in its entirety, describes a method to reduce both memory and data load time by providing a bottom up cell-level processing technique. A VHL provides a snapshot of the hierarchical overlapping of shapes for a particular cell in a semiconductor design. US Patent Application "Virtual Hierarchical Layer Patterning" Ser. No. 14/673,064 filed Mar. 30, 2015, which is hereby incorporated by reference in its entirety, describes a particular type of optimized virtual hierarchical layer (VHL) called a virtual hierarchical layer identical (VHLi). A virtual hierarchical layer identical (VHLi) includes geometric shapes that have the property of conveying identical layer patterns which encompass the global hierarchical information for all instances of an integrated circuit (IC) design cell.

Embodiments of the VHL create a hierarchical geometric layer for the purpose of performing an efficient hierarchical DRC process for verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information can be collected by finding any geometric shape not contained by the cell (i.e., not in the current cell or in any of its descendants) that is overlapping any hierarchical placement of the current cell. The obtained hierarchical information can then be used to compute the VHL. To gather the necessary geometric information regarding overlaps, all cells in the hierarchy can be processed against the current cell's boundary. A two-step procedure is used for the hierarchical information propagation in some embodiments. First, it is determined whether or not the cell being processed can overlap with the current cell. Then, if there is a potential overlap, the geometric shapes in the cell are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell can be collected for the VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed can be collected for the VHL generation. Some embodiments check to see if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in indirect sibling cell that overlap with the current cell can be collected for the VHL generation.

4) If the cell being processed is the direct descendant of the current cell, none of its data is collected for the VHL generation.

Once the hierarchical information has been collected, the VHL is calculated for the cell. Because the previously described procedures collect geometric shapes from other cells of the hierarchy which can have various placement orientations with respect to current cell, each collected shape is transformed to reflect its geometric position relative to the placement of the current cell when the overlap occurs. The process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell can be stored as a shape in the VHL. In this way, related shapes are merged and form the VHL, which in turn provides a snapshot of the hierarchical overlapping for the cell.

The embodiment described above generates VHL information for each cell only within its cell boundary. For example, if a geometric shape only abuts one placement of a cell, it will not show up in the VHL for the cell. Since it is important for some DRC algorithms to know the information surrounding the cell, another embodiment of the disclosed concepts for shape generation generates VHL shapes for an additional area surrounding the cell boundary. This second embodiment collects shapes in the same way as the previous embodiment, but instead of the original cell boundary, an oversized cell boundary (a virtual boundary) is used for the VHL calculation.

In such embodiments, the VHL is computed from collecting the hierarchical geometric shapes overlapping a cell's virtual boundary instead of its physical boundary. In the case of virtual boundary usage, the VHL includes the accumulation of the data comprising the overlapping shapes that are pushed into a cell's virtual boundary and then merged into complex geometric shapes. As noted, the virtual boundary is oversized, and includes a cell's merged layer boundaries plus an additional cell margin referred to as an ambit. The ambit area is a ring-shaped area extended outside the original cell boundary and created by extending the cell boundary by a small value known as the ambit value. Creating an ambit is also referred to as oversizing the cell. Hierarchical data that overlaps the oversized current cell is pushed from parent cells and sibling cells into the current cell and then pushed into the virtual boundary. Hierarchical data that does not overlap the current cell boundary but does overlap the ambit portion is also pushed into the virtual boundary. As a result, the geometric shapes overlapping the ambit extension area will be collected, and, along with the shapes overlapping the cell's actual boundary, will be computed into the complete VHL for the cell. In this way, hierarchical information on potentially interactive shapes for a cell is stored in the VHL, even if the shapes are slightly outside of the cell's boundaries.

Some embodiments also include an apparatus that executes VHL hierarchical algorithms as cell-level processes. A VHL allows the cell-level processes to accomplish an increased amount of cell-level data processing in the cell without flattening data out of the cell. The cell-level data processing for each VHL algorithm thereby eliminates the need for reloading data and limits memory consumption, since the entire layer hierarchy is not loaded into memory. In an additional embodiment, a single cell is processed, start to finish, by an instance of the VHL cell-level process, which allows for significant parallelization and multi-threading across all cells in an IC Design.

A DRC algorithm that uses a VHL takes in the pre-generated VHL shapes together with the input data layers and performs cell-level geometric operations. The creation of the VHL is a separate process that occurs before the DRC algorithms begin. Existing DRC tools acquire hierarchical information as the DRC algorithms are cycling on the hierarchical geometric shapes, thus the collected information in the VHL can be fed in to existing DRC tools. A VHL is independent from any particular DRC algorithm; one VHL is not limited to use by a specific DRC algorithm. Thus, if two DRC algorithms are performed on the same input data layers, both algorithms can share the same VHL. The sharing and reuse of the VHL provides efficiency and flexibility for the implementation of DRC algorithms.

The size of the VHL data is a factor in the efficiency of the DRC tools. A smaller VHL data set uses a smaller memory footprint and reduces the computational load in managing the VHL data. Virtual cell model geometry compression reduces the size of the VHL data by adding and/or subtracting area from the original geometric shapes in order to reduce the number of corners for the geometric shapes, thereby reducing the size of the VHL data.

In general, multiple models can be used to correctly describe a cell for physical verification. Many different sets of model shapes can produce equally valid results in later stages of manufacturing. Given that a simpler model will result in a smaller memory footprint and reduced computation as compared to a more complex model, simplifying models can be an important goal. The simplicity of a model is determined in large part by the number of corners present in the model shapes, as the memory and processing time for a model is proportional to the number of corners it contains. Shapes with a small number of corners are simpler than shapes with a large number of corners. Therefore, geometry compression is a technique that reduces the number of corners for a model and thus can increase a model's efficiency.

The optimal set of model shapes is always a minimal memory representation of the model, and thus requires minimal CPU time to process. It is often not computationally feasible to determine the optimal model shapes for a given design, due to the total number of shapes present. Instead, various techniques are used to generate reduced models which are not perfectly optimal minimal memory design representations, but instead provide a functional model of a design for DRC checking and verification purposes.

Cell-level data and VHL shapes are processed in a cell to produce the model shapes. The model's interaction with the VHL data determines which sections of the shapes are relevant in parent cells. In some embodiments, irrelevant portions of the shapes are then removed in a manner designed to reduce the number of corners in the resultant models, producing models which are geometric subsets of the original model data. Likewise, irrelevant portions can be added to the shapes in order to minimize irrelevant areas between the edges of shapes in the parent. The irrelevant areas can be filled without affecting the correctness of the model. The filling of notches or holes in the model shape can produce simpler model shapes with fewer corners than in the original model. Model shapes produced by adding shapes do not solely represent geometric subsets of the input data.

The new model shapes can be thought of as optimizations of the virtual hierarchical layer (VHL) models. The reduced set of model shapes represent a compressed model and can replace the original shapes in a VHL. The compressed model shapes retain enough information that the parent cell is able to discern the pertinent geometric features of any child cells. The compressed model data is not unique; different model shapes that promote efficient geometric processing in the parent cell can be used to represent a child cell. The virtual cell model geometry compression can also be used to generate context models for an edge generation algorithm.

Further Details

FIG. 1 shows a flow for virtual cell model geometry compression. The flow 100 describes a computer-implemented method for design analysis. The flow 100 can include obtaining a semiconductor design containing a plurality of cells and a plurality of virtual hierarchical levels. The cells can be any of a variety of cells including analog cells, digital cells, logic cells, memory cells, switching cells, communication cells, and so on. The virtual hierarchical layers (VHL) can be hierarchical geometric layers which can be created for hierarchical design rule check (DRC) processing. The VHL can include geometric layers in a cell of a semiconductor design. The geometric layers can include geometric shapes such as rectangles, rhombi, trapezoids, polygons, etc. The semiconductor design can be obtained from a library of design layouts which are stored in computer-readable formats. The design can be obtained by reading one or more of the computer files from one or more storage media, by being stored in and then retrieved from computer memory, by using an RTL design description to generate a circuit design, by receiving design data entered by a user, by receiving wired or wireless communications, by scanning layout images, and so on.

The flow 100 includes identifying a cell and multiple instances of the cell from a semiconductor design 110 including a plurality of cells and a plurality of virtual hierarchical levels. The cell which is identified can be any cell appropriate to the semiconductor design and can be any of a variety of cells. For example, the cell can be an analog cell, a digital cell, a logic cell, a storage cell, a sensor cell, a communication cell, and so on. The cell can be one of many repetitions of the cell. The identified cell can be repeated throughout the semiconductor design, where the semiconductor design can include hierarchical levels. The cell and the instances of the cell can be identified for any relevant design purpose including design rule checking (DRC), evaluation for compliance with design rules for manufacturing (DRM), logic simulation, design analysis, design verification, design validation, and so on.

The flow 100 includes loading virtual hierarchical layer (VHL) 120 data based on the cell. A VHL stores the accumulation of the geometric shapes, from a data layer, which hierarchically overlap any placement of the cell in an IC design. A VHL can be generated from hierarchical geometric data related to the cell. The VHL can include various polygons including rectangles, trapezoids, rhombi, complex polygons, etc. The polygons included in the VHL can comprise geometric shapes in the hierarchical design levels. The geometric shapes can interact with the cell and instances of the cell. The VHL can include geometric shapes which overlap cell data contained within the cell and instances of the cell. The data in the VHL can be pushed to the VHL from parent cells, sibling cells, and so on. Multiple virtual hierarchical levels can be related to the identified cell and instances of the identified cell. In some embodiments, the cell boundary is expanded by an ambit value for the purposes of generating the VHL.

In some embodiments, the flow 100 comprises loading VHL data that includes power rails 122. Power rails in a standard cell often include polygons that extend horizontally across the width of the cell and extend to near the borders of the cell. Power rails also commonly include many additional geometric shapes extending from the polygon near the border of the cell into the interior of the cell. The cells are typically placed in such a way as to ensure overlap with other cells, producing VHL shapes which cover the polygon near the border but only abut the polygons that extend into the interior of the cell. In many cases, the widths of the polygons near the border of the cell are the same as the widths of the polygons in overlapping cells. Although many power rails exhibit the characteristics listed, some power rails can have different characteristics.

The flow 100 includes obtaining a virtual cell model 130 representative of the cell. A virtual cell model can be created for any cell in a semiconductor design. The virtual cell model can be built from a virtual hierarchical layer. The virtual cell model can include model data and a model channel. The virtual cell model can be used by various VHL algorithms for a variety of design purposes including design rule checking (DRC), evaluation for compliance with design rules for manufacturing (DRM), and so on. The virtual cell model can include data which is propagated from a child cell to a parent cell. The flow 100 can include generating model data 132 based on interactions between data within the cell and the VHL data. The interactions can include interactions between shapes in the cell and shapes in other layers of the hierarchical design. The interactions can be based on interactions among geometric shapes. The interactions can be between and among layers in a semiconductor design. The flow 100 can include creating an empty cell model 134 comparable with the cell which was identified. An empty cell model can be created in order to receive various types of data relevant to the semiconductor design. The various types of data can include information such as cell data, VHL data, etc. The empty cell model can be used to accumulate model data in order to build up the cell model. The cell model can be used for a variety of design purposes including simulation, analysis, verification, validation, etc., of the semiconductor design.

The flow 100 includes determining interactions 140 between data within the cell and the VHL data. Various types of interactions can occur between data within the cell and the VHL data. For example, the interactions can include interactions between shapes in the cell and shapes in the VHL. The interactions can be based on geometric shapes. The geometric shapes can be polygons and/or portions of polygons. The polygons can include rectangles, trapezoids, rhombi, complex trapezoids, and so on. The interactions can be between and among layers in a semiconductor design.

The flow 100 includes selecting relevant portions of shapes 150 based on the determining. The shapes which can be determined can include shapes within the cell data and shapes in the VHL data which interact with one another. The shapes can include polygons, portions of polygons, and so on. The shapes can be selected for a variety of design purposes including analysis, simulation, validation, verification and so on. For example, the shapes can be selected for the purposes of compressing the virtual cell model geometry. The compression can reduce computational resource requirements. In embodiments, the relevant portions of the shapes interact with polygons in an overlapping cell. An overlapping cell for a given cell can appear anywhere in the design hierarchy of the semiconductor design. In embodiments, the relevant portions are used to resolve the interactions with a parent cell, an ancestor cell, a direct sibling cell, or an indirect sibling cell. The interactions can include interactions between polygons, portions of polygons, and the like. The interactions can occur between and among the cell and a parent, ancestor, and/or sibling cell.

The flow 100 includes reducing the amount of data within the virtual cell model based on the interactions 160 which were determined. The determined interactions between the cell and the parent cell, ancestor cell, sibling cell, etc. can be used to reduce the data in the virtual cell model by adding shapes, removing shapes, simplifying shapes, or any other method of reducing the data in the virtual cell model. The compressed model and the compressed model shapes can be used to replace the original virtual cell model and the original shapes in the virtual cell model. The compressed model shapes retain sufficient information for the parent cell to discern any pertinent geometric features of the child cell. The compressed model data might not be unique. For example, various shapes can be used to represent a child cell to a parent cell. The geometric features can be chosen based on a variety of parameters, including data representation efficiency and simulation efficiency, among others.

The flow 100 further can further comprise removing shapes which are not part of the relevant portions 162. As an example, shapes which are not part of the relevant portions can include shapes which are not relevant in parent cells. The cell-level data and the VHL shapes can be processed within a cell to produce the model shapes. In some embodiments, the removing reduces a number of corners included in the virtual cell model. The shapes in a virtual cell model can include polygons, where the polygons can include, but are not limited to, triangles, rectangles, rhombi, trapezoids, concave polygons, polygons with holes, and complex polygons. The complex polygons, for example, can be constructed from other polygons. Removing one of the polygons from the complex polygon can reduce the number of corners in the complex polygon. The flow 100 can include removing trapezoidal shapes 164 which do not interact with the VHL data. The trapezoidal shapes can be part of the complex polygon in some cases. Similarly, other polygons such as triangles, rectangles, rhombi, etc., are also removed in some embodiments.

The flow 100 can further comprise removing fake portions of shapes 166 from shapes in the virtual cell model. A context model can be used as part of an edge generation algorithm. The context model can be used in a parent cell, for example, to remove fake edges from shapes in the parent cell. Fake edges can result when an edge of a shape in the parent cell is crossed by a shape in the child cell, thus, in at least some embodiments, the fake portions of shapes are based on shape edges or shape corners, in an overlapping cell, being crossed by a shape in the cell. From the perspective of the child cell, the context models can be necessary in order to accurately represent geometric shapes in the child cell. Removing the fake portions of shapes can simplify the shape and result in streamlined models, reduced numbers of corners, reduced computational resource requirements, and reduced memory requirements, among other advantages.

The flow 100 can further comprise adding to the relevant portions in order to reduce the number of corners 170 within the virtual cell model. The flow 100 can comprise filling a notched polygon 172 and can also comprise filling a holed polygon 174. As with removing trapezoids and other polygons from a shape in order to reduce the number of corners of a complex polygon, shapes can be added to the polygon with the same effect. For example, a C-shaped polygon can have eight corners. By filling in the center part of the C-shaped polygon, the resulting polygon, now a rectangle, only has four corners. Use of a polygon with fewer corners can reduce computational resource requirements. The adding retains the correctness of the virtual cell model for representing the cell. The polygon resulting from the adding can be one of multiple different representations of child cell data in a parent cell. In general, there is no single correct representation. The adding can include trapezoidal shapes or any other geometric shape or shapes appropriate to reducing the number of corners of the complex polygon. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
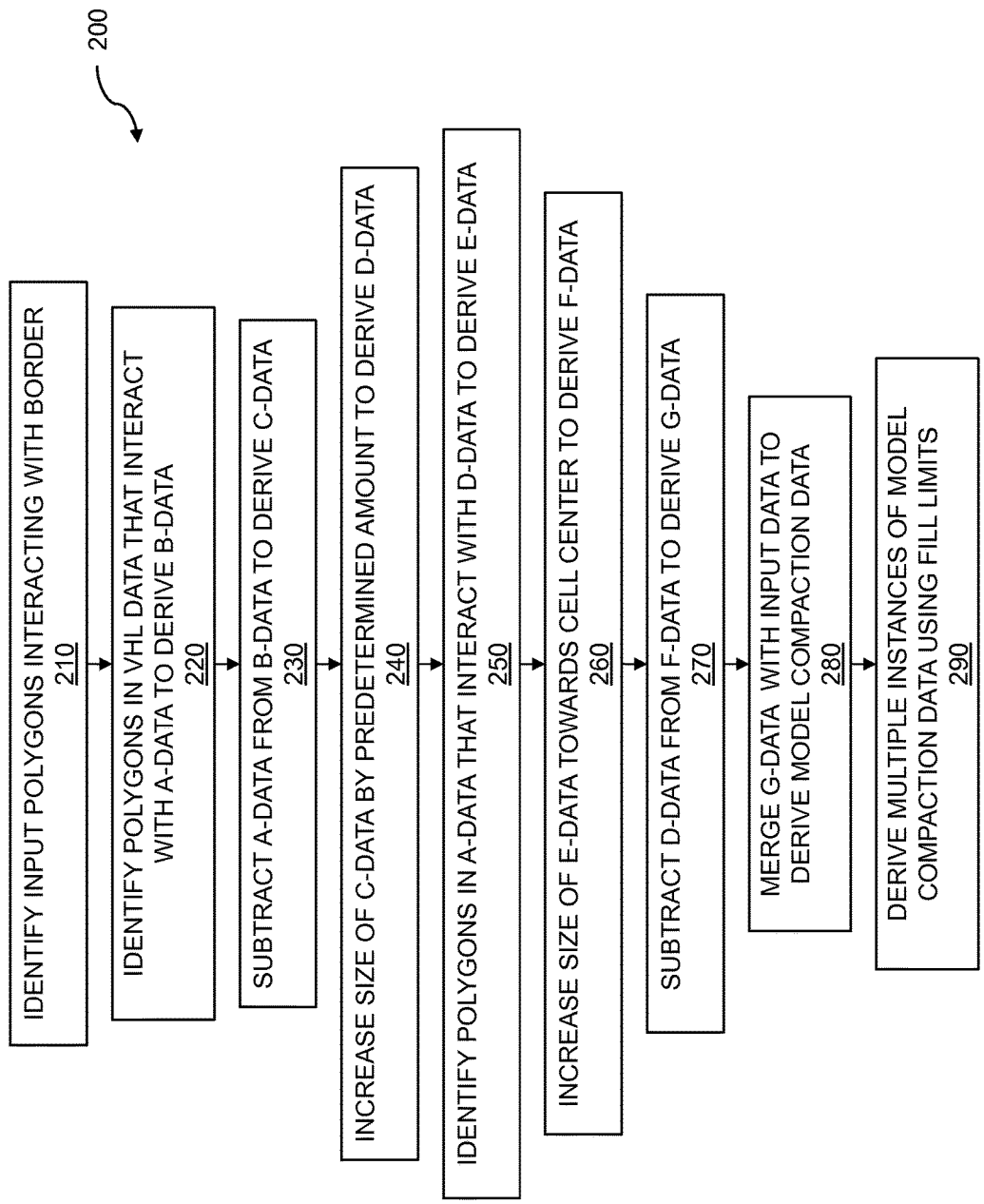
FIG. 2 shows a flow for determining interactions between cell data and VHL data.
Figure 6:
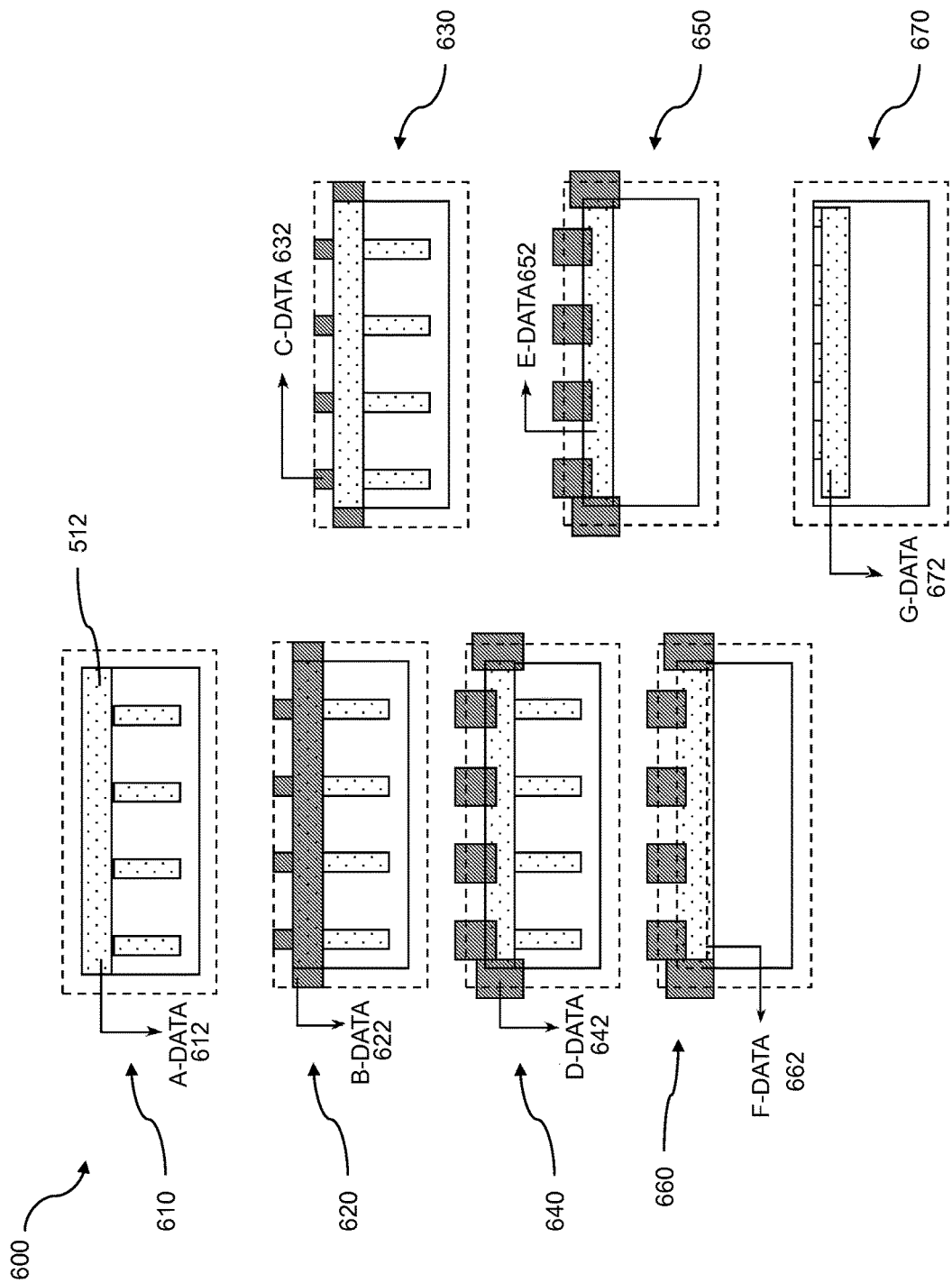
FIG. 6 shows example determining interactions between cell data and VHL data.
Figure 7:
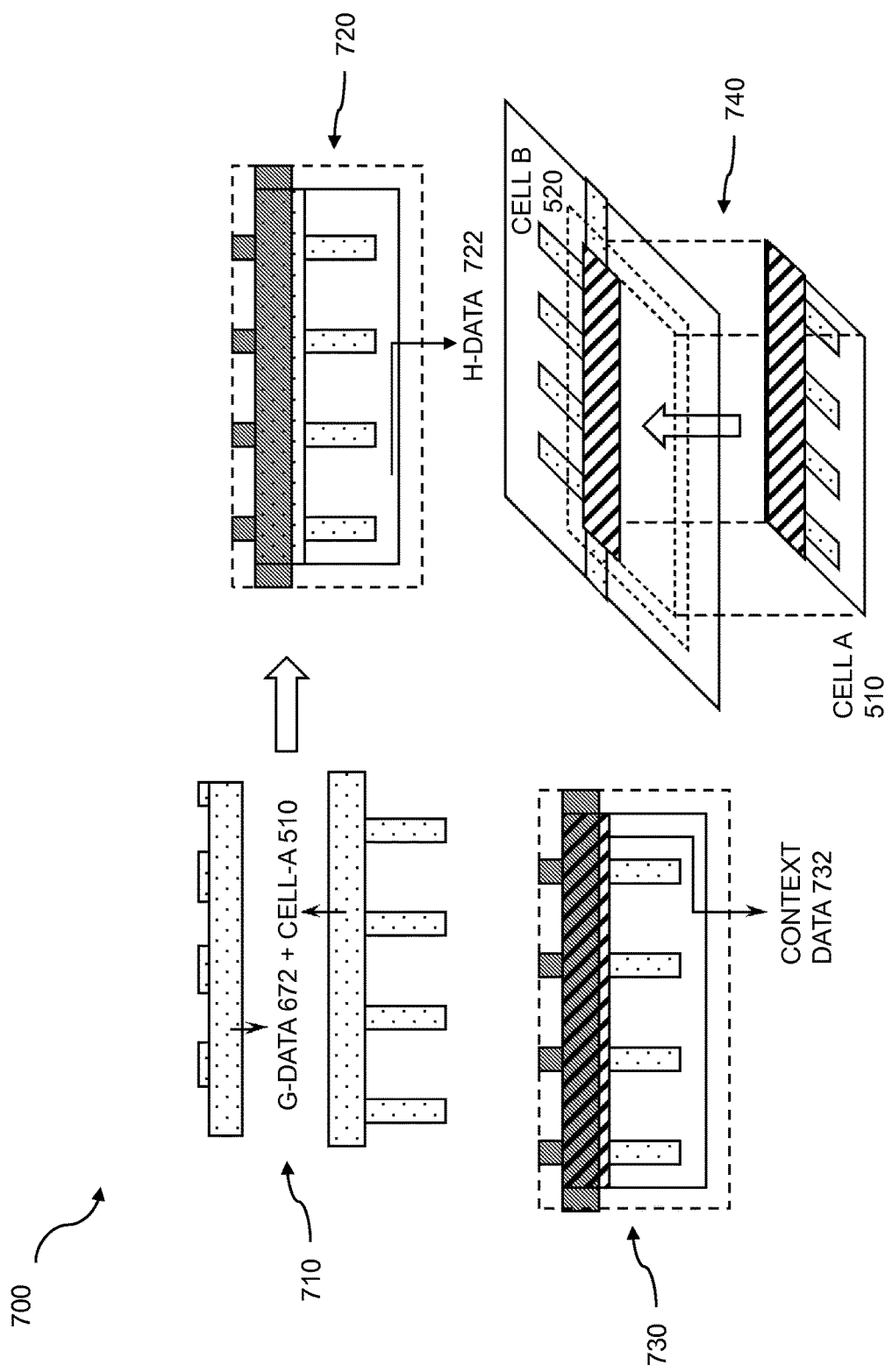
FIG. 7 shows example determining model compaction data.

FIG. 2 shows a flow for determining interactions between cell data and VHL data. The flow 200 shows one embodiment for determining interactions, between data within the cell and the VHL data, and selecting relevant portions of shapes based on the determining, which is a part of a computer-implemented method for design analysis. FIGS. 6-7 of this document provide additional illustration of the flow 200. The flow 200 describes a method to reduce the complexity of models by filling in gaps between model edges in areas where the operation does not affect the processing or checking. The filling can be accomplished by generating edges. For the edge generation algorithm to work, however, context models are required to accurately represent the input data under and immediately adjacent to the VHL data. Models which represent the remainder of a cell's area, that is, the area which does not interact with VHL data, do not affect the result generated in the parent cell. Model shapes in these non-interactive areas can thus be chosen in such a way as to reduce the number of overall corners, and thus the complexity, of the model data.

The flow 200 includes identifying a plurality of input polygons interacting with a border of the identified cell 210 to derive A-data. A cell boundary can be defined as the rectangular boundary that encloses all geometric shapes from one or more data layers of the IC design for a cell. By default, when used without specifying any data layer, the term "cell boundary" refers to the cell boundary of all the layers in the IC design. An input polygon can be any type of polygon with any number of edges, including, but not limited to, a triangle, a rectangle, a trapezoid, a concave polygon, a holed polygon, or a complex polygon. In at least one embodiment, an input polygon is deemed to interact with a border if any portion of the polygon overlaps with the border. In some embodiments, the cell boundary is expanded by an ambit value before the identifying of the plurality of input polygons interacting with the border takes place. The term "A-data" is used as a signifier to represent, in this particular embodiment, a set of input polygons that interact with the cell border of a particular cell type somewhere in the semiconductor design.

The flow 200 also includes identifying polygons within the VHL data that interact with the A-data to derive B-data 220. The VHL data for the cell is loaded and compared with the A-data. If any of the geometric shapes of the VHL data overlap with one or more of the polygons of the A-data, the VHL data is deemed to interact with the A-data. In some embodiments, if a geometric shape of the VHL data is directly adjacent to a polygon of the A-data, it is also deemed to interact with the A-data. The term "B-data" is, as was the case with "A-data," simply a signifier used in this embodiment to encompass a set of polygons that interact with the A-data.

The flow 200 continues with subtracting the A-data from the B-data to derive C-data 230. The subtracting can be done by any method. In some embodiments, a Boolean AND is performed between the B-data and a Boolean NOT of the A-data. In some embodiments, an empty cell model is created as a part of the subtraction. As previously was the case, the term "C-data" is simply a signifier used in this embodiment to encompass a set of polygons generated by subtracting the A-data from the B-data.

The flow 200 further includes increasing a size of the C-data by a predetermined amount to derive D-data 240. Increasing the size of the C-data comprises increasing the size of the polygons included in the set of polygons that comprise the C-data. It does not necessarily imply that the amount of data in the D-data is larger than the amount of data in the C-data. The predetermined amount can vary between embodiments, but in some embodiments, it is a small amount compared to the size of the cell boundary. In at least one embodiment, the predetermined amount is the same as the ambit size that is used to grow the cell boundary, although in other embodiments, the predetermined amount can be larger or smaller than the ambit size. In some embodiments, the predetermined amount is based on a design rule for the semiconductor process used. As previously was the case, the term "D-data" is simply a signifier used in this embodiment to encompass a set of polygons generated based on the C-data.

The flow 200 includes identifying polygons within the A-data that interact with the D-data to derive E-data 250. Two polygons are deemed to interact if they overlap with each other. In some embodiments, two polygons are also deemed to interact if they are directly adjacent, that is, if they share at least a portion of an edge with each other. As previously was the case, the term "E-data" is simply a signifier used in this embodiment to encompass a set of polygons that are a subset of the polygons of the A-data that interact with the D-data.

The flow 200 also includes increasing the size of the E-data towards a center of the cell to derive the F-data 260. Increasing the size of the E-data comprises increasing the size of the polygons included in the set of polygons that comprise the E-data in the direction of the center of the cell. It does not necessarily imply that the amount of data in the F-data is larger than the amount of data in the E-data. The amount of the increased size can vary between embodiments, but in some embodiments, it is a small amount compared to the size of the cell boundary. In at least one embodiment, the increased size is the same as the ambit size that is used to grow the cell boundary, although in other embodiments, the increased size can be larger or smaller than the ambit size. In some embodiments, the increased size is based on a design rule for the semiconductor process used. As previously was the case, the term "F-data" is simply a signifier used in this embodiment to encompass a set of polygons generated based on the E-data.

The flow 200 continues with subtracting the D-data from the F-data to derive the G-data 270. The subtracting can be done by any method. In some embodiments, a Boolean AND is performed between the F-data and a Boolean NOT of the D-data. In some embodiments, an empty cell model is created as a part of the subtraction. As previously was the case, the term "G-data" is simply a signifier used in this embodiment to encompass a set of polygons generated by subtracting the D-data from the F-data.

The flow 200 further includes merging the G-data with input data to derive model compaction data 280. The merging can be done by any method. In some embodiments, a Boolean OR is performed between the G-data and the input data. The model compaction data can also be referred to as context data. Model compaction can also be referred to as geometry compression. The model compaction data can include a set of polygons generated by the merging of the G-data with the input data.

In some embodiments, the flow 200 includes deriving multiple instances of model compaction data using a plurality of fill limits 290, and selecting a model compaction data instance with a maximum reduction of corners. In at least one embodiment, model compaction comprises the reduction of the number of corners of the polygons of the model compaction data. In some embodiments, model compaction includes removing portions of one or more of the polygons of the model compaction data, while in other embodiments, model compaction includes adding portions to one or more of the polygons of the model compaction data. Adding a portion to a polygon can be done to fill in a concave portion of a polygon, such as a notch or a hole. A fill limit can be included to define the maximum distance to be filled in a concave, notched, or holed polygon.

In embodiments, a model compaction with portions added to polygons is performed multiple times, each iteration with a different fill limit. The resulting data from the multiple model compactions is then compared to find the fill limit that resulted in the maximum reduction of corners in the polygon data. The model compaction that was performed with the optimal fill limit is then selected as the compressed data to use in further processing by the DRC tools.

Figure 3:
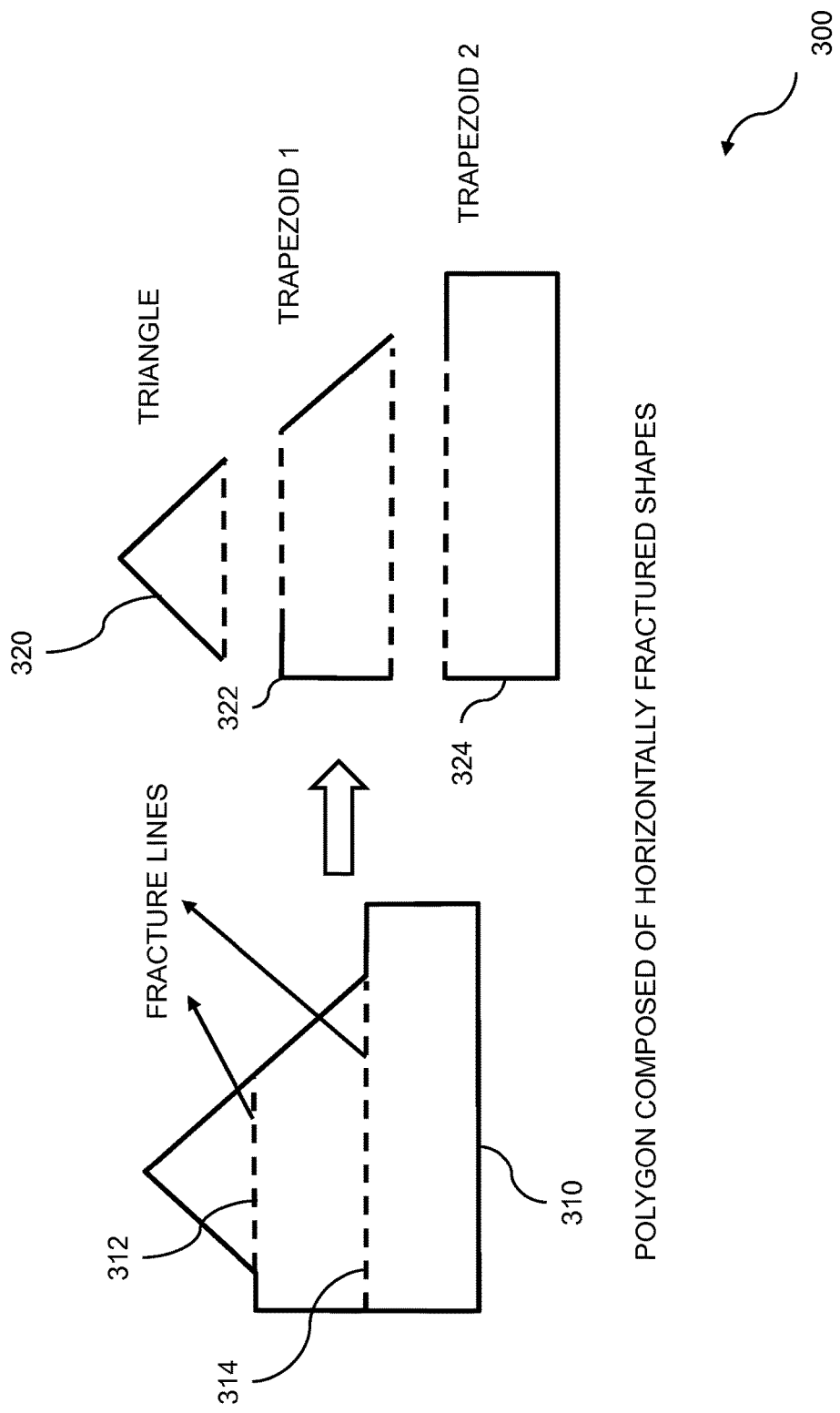
FIG. 3 shows an example polygon composed of horizontally fractured trapezoids.

FIG. 3 shows an example polygon composed of horizontally fractured trapezoids. The drawing 300 shows a complex polygon 310 that could have been generated in many different ways, depending on the particular design. In some cases, the input data for a cell can include the polygon 310. In other cases, the polygon 310 might have been generated by the merging of multiple rectangles. In some embodiments, polygons are stored in two-dimensional tree structures (similar to quad trees) to allow for efficient range searching. Any polygon can be fractured into a set of simple triangles and trapezoids by intersecting the polygon with a set of parallel lines, also called fracture lines. Each corner, or vertex, of the polygon is intersected by one fracture line, but a single fracture line can intersect any number of corners. Fracture lines that are on an exterior edge of the polygon, that is, when the entire polygon is on one side of the fracture line, can be ignored.

In the drawing 300, the polygon 310 is intersected by two fracture lines, a first fracture line 312 and a second fracture line 314. The two fracture lines allow the polygon 310 to be fractured into a triangle 320, a first trapezoid 322 and a second trapezoid 324. By dividing the polygon 310 into a set of triangles and trapezoids, the polygon 310 can be represented by a two-dimensional tree structure. Some embodiments utilize the tree structure in such a way that each polygon is represented by a collection of horizontally fractured trapezoids (and triangles) to allow the algorithms of the DRC tools to operate on the polygon fragments efficiently. In some embodiments, the subset of all trapezoids in the child cell which interacts with VHL data is selected for the model compaction data. If this represents the final stage of virtual cell model geometry compression, which is the case in some embodiments, the data output represents a geometric subset of the original input data. That is, the model shapes never extend outside the boundaries of the original shapes from which they were derived. Other embodiments use every polygon which interacts with VHL data in their entirety, or use the intersection of the geometric shape and VHL data. Both of these situations produce context data which can be larger than embodiments where the subset of all trapezoids in the child cell which interact with VHL data are selected.

Figure 4:
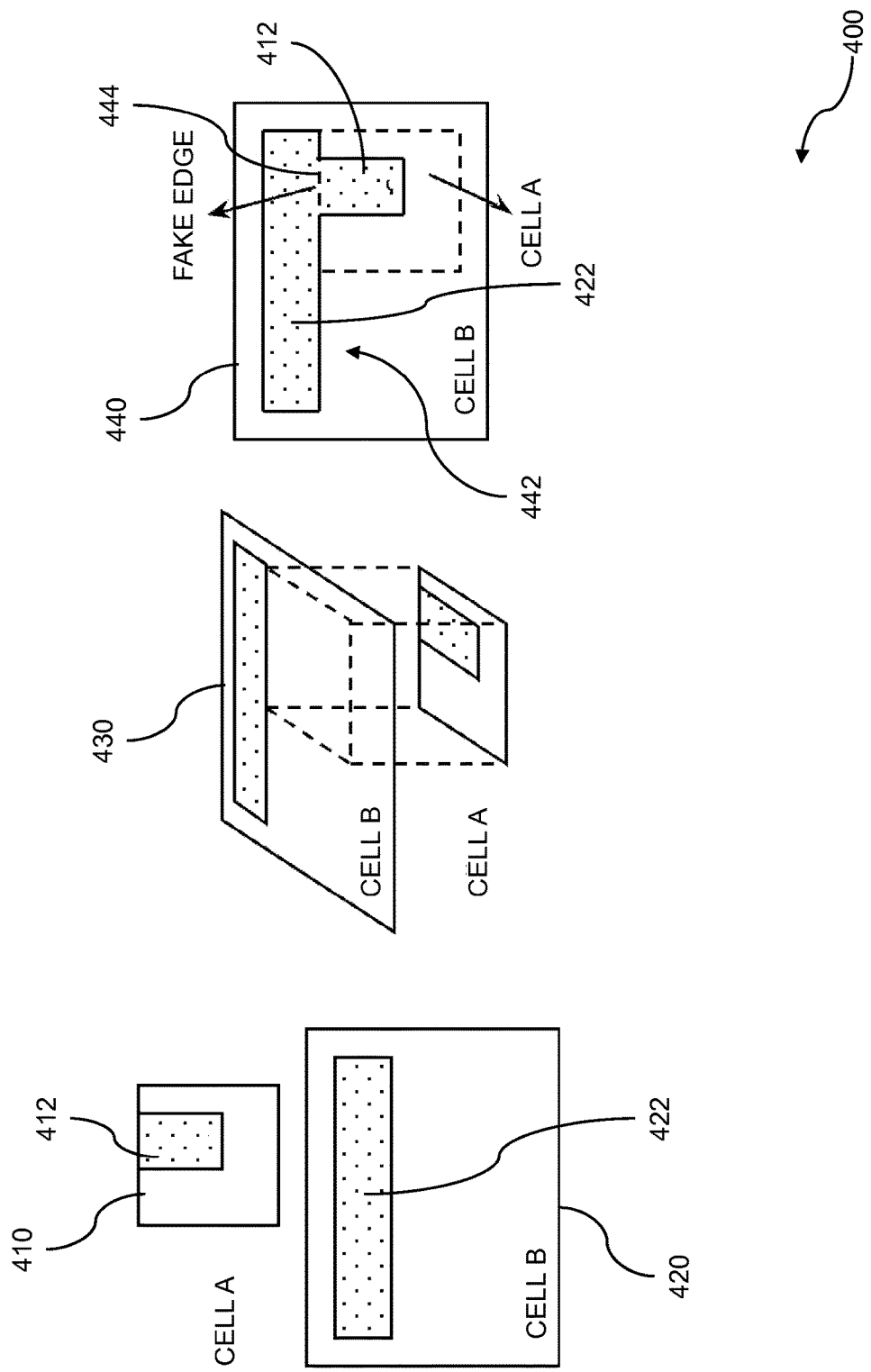
FIG. 4 shows example fake edges produced by hierarchical data interaction.

FIG. 4 shows example fake edges produced by hierarchical data interaction. The drawing 400 shows Cell A 410 which includes a shape 412 on a layer 1 and Cell B 420 which includes a shape 422 on the layer 1. The drawing 400 also shows a hierarchical view 420 of a portion of an electronic design with an instantiation of Cell B 420 and Cell A 410. A view 430 shows the Cell B shape with the Cell A shape shown in perspective. Another view 440 shows the same portion of the electronic design from the top with Cell A 410 merged with Cell B 420. The merger of the shape 412 of Cell A and shape 422 of Cell B creates a new shape 442 which is shaped like a distorted "T." If the shape 442 is then fractured into multiple trapezoids, a fake edge 444 is generated. For the edge generation algorithm, context models can be used in parent cells to remove fake edges where the edge of a shape in the parent cell is crossed by a shape in the child cell, as shown. From the perspective of a child cell, context models are required to accurately represent geometric shapes in the areas where the shapes overlap or touch VHL data. In embodiments where horizontally fractured trapezoids (and triangles) are put into a database for comparing to the VHL and those portions (e.g. individual fractured trapezoids or triangles) that do not interact with the VHL are discarded, the selected trapezoids that interact with the VHL data can provide sufficient information to remove fake edges later in the processing. Fake edges can be identified by having an edge of one polygon that is the same as an edge of another polygon.

Figure 5:
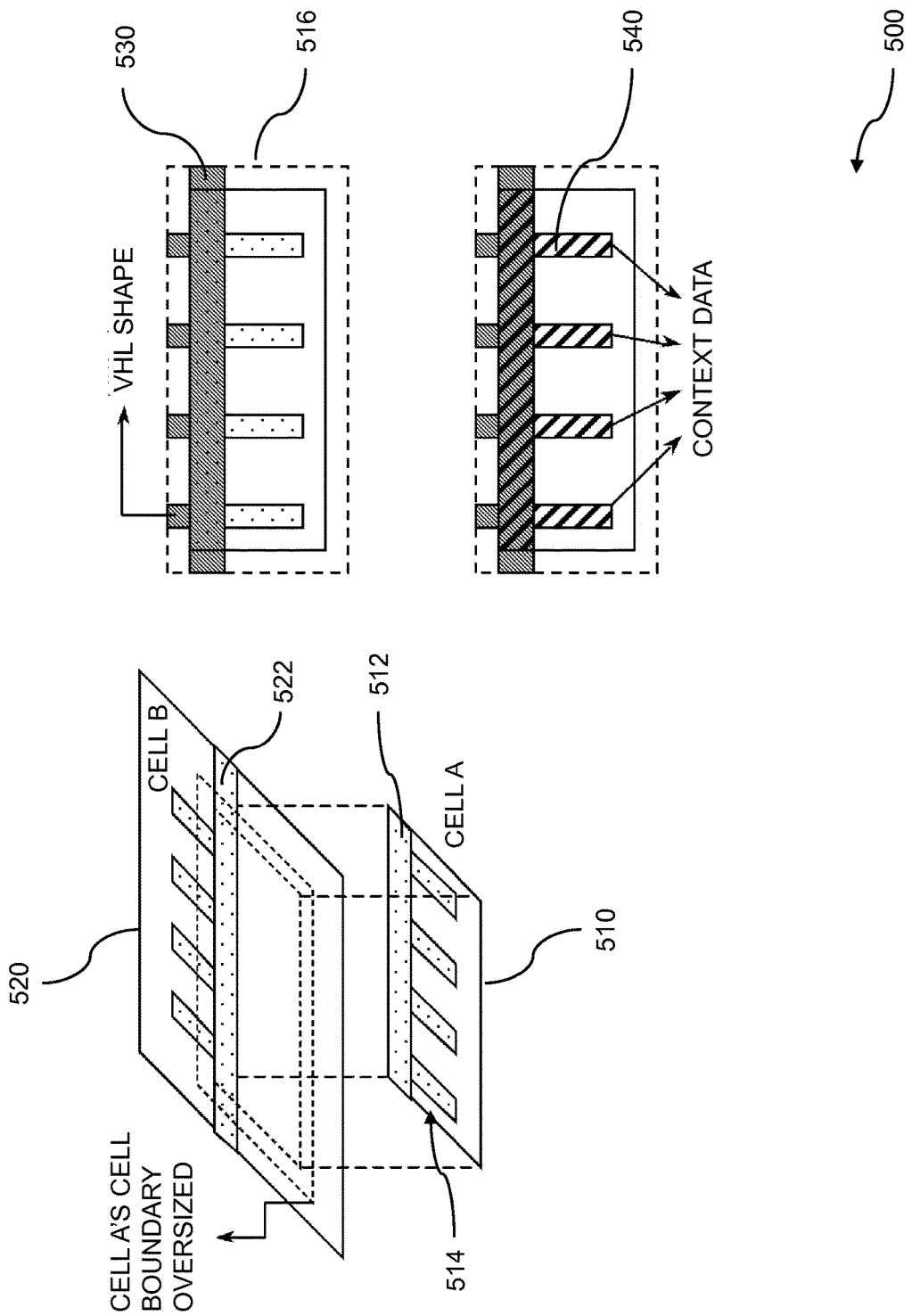
FIG. 5 shows an example context data generation algorithm for edge generation.

FIG. 5 shows an example context data generation algorithm for edge generation. The data structure used to store geometric data in some embodiments makes computing the optimal shape for the models expensive. From a statistical standpoint, some of the models which benefit most from virtual cell model geometry compression are models for the metal rails which connect power to standard cells. The drawing 500 shows Cell A 510, which is a metal rail type cell, instantiated in Cell B 520.

Standard cell power rails often have the following four characteristics:

1. The rail polygons extend horizontally across the width of the cell. Cell A 510 includes rail polygon 512.

2. The rail polygons are solid near the borders of the cell, as shown by rail polygon 512, with multiple fingers extending into the interior of the cell. Cell A 510 includes four such fingers 514.

3. Placements of the cell overlap with other standard cells, such as Cell B 520, producing VHL shapes which cover the solid portion of the power rail but only abut the fingers. Cell B 520 includes such a shape 522 which overlaps the rail polygon 512 near the border of Cell A 510. The VHL shape 530 for Cell A 510 shows the portions of the shapes in Cell B 520 that interact with Cell A 510. Note that the boundary 516 of Cell A 510 has been extended by an ambit value for the purposes of calculating the VHL shape 530. Because the shape 522 overlaps the shape 512, the VHL shape 530 covers the solid portion of the power rail 512 but only abuts the fingers 514.

4. The widths of the solid portion of the power rails are identical for all interacting sets of standard cells. In the example shown in the drawing 500, the width of the polygon 512 of Cell A 510 is the same as the width of the polygon 522 of Cell B 520.

Also included is context data 540, which comprises the data of Cell A 510 that interacts with the VHL shape 530. In some embodiments, the virtual cell model geometry compression is used to compress VHL data. In some embodiments, the virtual cell model geometry compression can be used to compress context data 540.

While virtual cell model geometry compression can be applied to, and can reduce the amount of data for, many different types of cells, it is computationally easy to identify cells with the above characteristics. Using the virtual cell model geometry compression on cells having the four characteristics listed above generally provides significant compression of the cell data. Once this type of cell has been identified, FIGS. 6 and 7 show a method to produce simpler models than the original model generation algorithm.

FIG. 6 shows example determining interactions between cell data and VHL data. The diagram 600 shows a method of determining the interactions between the shape data of Cell A 510 and the VHL shape 530, as shown in FIG. 5.

Input polygons interacting with the cell border are selected in the view 610. The selected polygon(s) are labeled as A-data 612. In the example shown, the rectangle 512, which is adjacent to the original cell boundary of Cell A 510, and therefore deemed to interact with the boundary, is selected to be included in the A-data 612. VHL polygons interacting with A-data 612 are then selected and labeled as B-data 622. The labeling is shown in the view 620, illustrating that the entire VHL shape 530, which is shaded in the view 620, interacts with the A-data 612, and is therefore included in the B-data 622.

The view 630 shows the results of subtracting the A-data 612 from the B-data 622, leaving the six small shaded rectangles. The results of the subtracting are labeled as C-data 632. The C-data 632 is then oversized by a small amount to create D-data 642. The view 640 shows the oversizing of the C-data 632 to create the D-data 642 as the larger shaded rectangles. The amount of the oversizing varies according to the embodiment, but the amount of oversizing is determined based on the semiconductor fabrication process used, in at least some embodiments.

Trapezoids from A-data 512 that interact with the cell border are selected as the E-data 652 as shown in the view 650. Then, the E-data 652 is grown toward the center of cell, or away from the border that it interacts with, by a small amount to create F-data 662. This is shown in the view 660. The view 670 shows the results of subtracting the D-data 642 from the F-data 662 to create the G-data 672.

FIG. 7 shows example determining model compaction data. The diagram 700 shows the merging of the G-data 672, as created above, with the original shape of Cell A 510 in the view 710 to create H-data 722 as shown in the view 720. The H-data 722 is model compaction data. The virtual cell model geometry compression can be applied to the H-data 722 to generate compressed context data 732. In the example shown in the view 730, the H-data 722 is fractured into trapezoids (rectangles in this example), and those rectangles that are not relevant to the parent cell are discarded from the context data, leaving only the striped rectangle as the context data 732. The view 740 shows the context data 732 passed from the child Cell A 510 to the parent Cell B 520. Note that the H-data 722 includes 40 corners, but that the results of the virtual cell model geometry compression yield context data 730 which can be described using only four corners. The optimized models produced by the new algorithm can be intermixed with models from other cells which have been produced by the original model optimization method.

Figure 8:
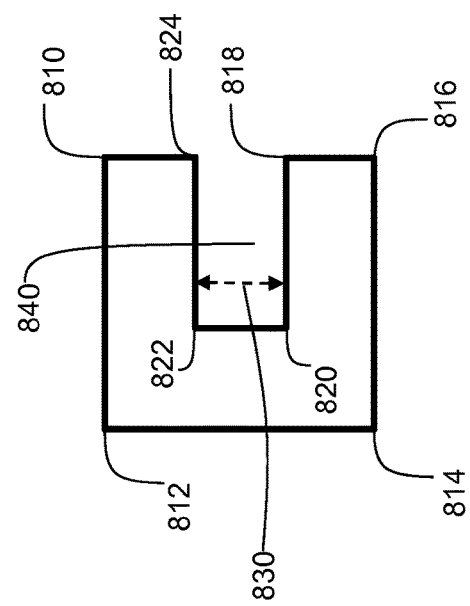
FIG. 8 shows an example of an unfilled notched polygon.

FIGS. 8-11 show examples of adding data to original geometric shapes in order to reduce the number of corners in the model data. FIG. 8 shows an example of an unfilled notched polygon. The unfilled notched polygon 800 is an example of data that could be included in context data, or model compaction data, that is to be reduced or compressed as described herein. The notched polygon 800 can be referred to as a "C-shaped" polygon or a concave polygon. The polygon 800 comprises eight corners, identified as corners 810, 812, 814, 816, 818, 820, 822, and 824. The polygon 800 has a notch 840 that is surrounded by the polygon 800 on three sides. The number of corners of this type of polygon can be reduced to only four corners by the filling of the notch 840. A fill limit 830 defines the maximum distance to be filled by the virtual cell model geometry compression. If the size of the notch 840 is less than or equal to the fill limit 830, then the notch 840 is filled.

Figure 9:
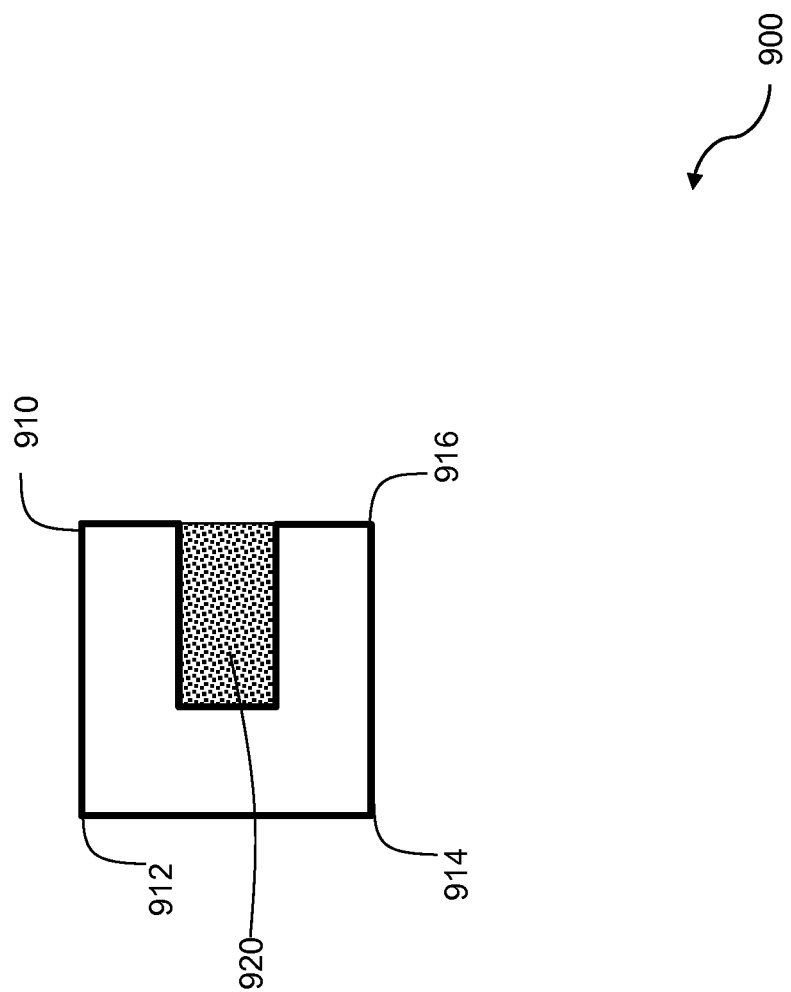
FIG. 9 shows an example of a filled notched polygon.

FIG. 9 shows an example of a filled notched polygon. The polygon 900 is the result of filling the notch 840 of the polygon 800 with a fill portion 920. The polygon 900 can be described with only four corners, 910, 912, 914, and 916, instead of the eight corners required to describe the polygon 800, resulting in a 50% reduction of the model compaction data. While the amount of data reduction provided by virtual cell model geometry compression varies depending on the details of the electronic design being verified, any reduction in data reduces memory footprint and computational requirements.

Figure 10:
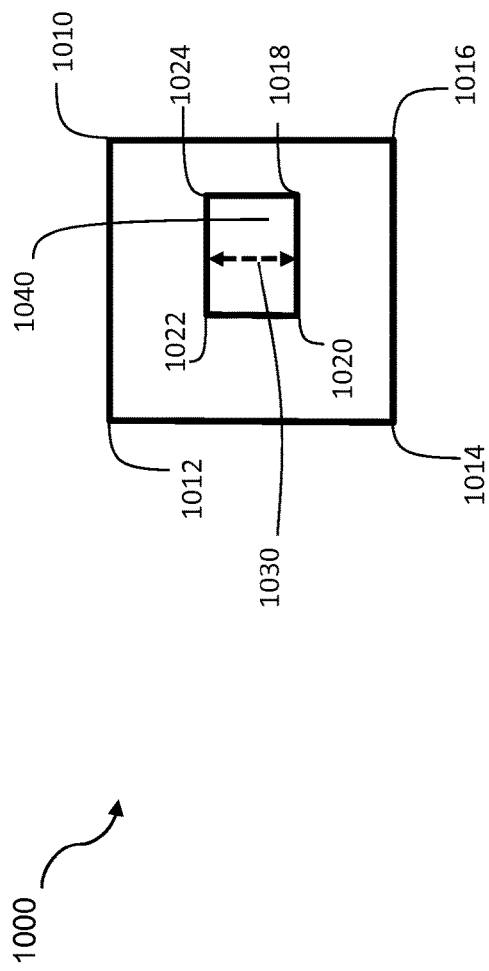
FIG. 10 shows an example of an unfilled holed polygon.

FIG. 10 shows an example of an unfilled holed polygon. The polygon 1000 is described by eight corners, or vertices, identified as corners 1010, 1012, 1014, 1016, 1018, 1020, 1022, and 1024. In some embodiments, the order of the corners defines the inside and outside of the polygon so that the area surrounded by the corners 1018, 1020, 1022, and 1024 can be defined to be outside of the polygon. Virtual cell model geometry compression can be performed on the polygon 1000 with a fill limit 1030. The fill limit 1030 defines the maximum distance to be filled. If the holed region 1040 is less than or equal to the fill limit 1030, then the polygon is filled by the virtual cell model geometry compression.

Figure 11:
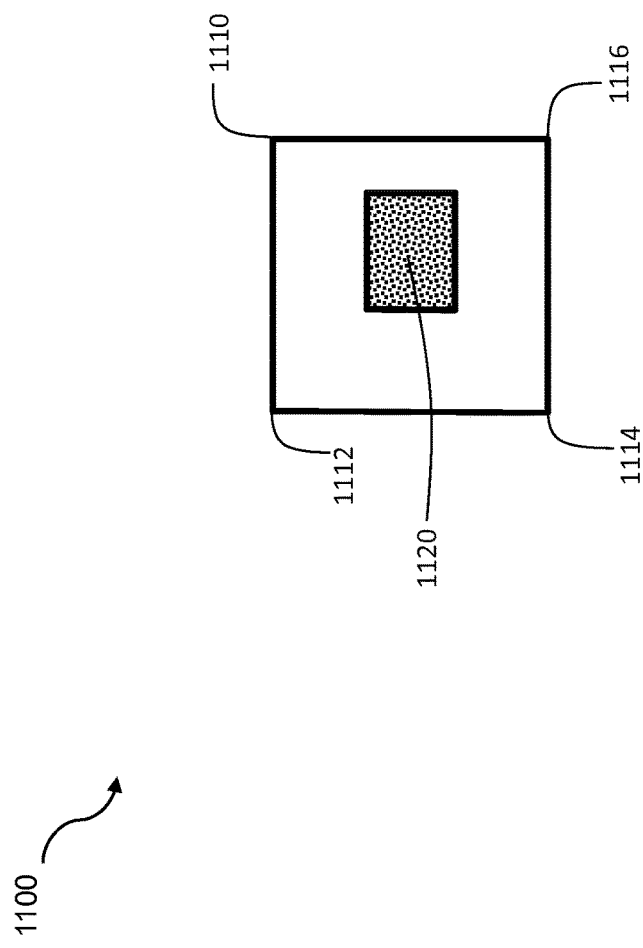
FIG. 11 shows an example of a filled holed polygon.

FIG. 11 shows an example of a filled holed polygon. The polygon 1100 includes a filled region 1120 that allows the polygon 1100 to be described using only four corners, 1120, 1112, 1114, and 1116, thereby creating model compaction data. This concept can be applied to polygons having any number of corners, or vertices, including those having more than eight corners.

In embodiments, one or more fill limits are established by the user or automatically derived by the system. The fill limits determine the maximum area to be filled during the data reduction process. In general, there is a tradeoff in data reduction between model simplicity and design rule checking. More filling reduces model simplicity, but can also increase the number of design rule checks that are invoked. Thus, it is desirable to perform filling up to a point where the number of corners are significantly reduced. In embodiments, model compaction data is generated using a plurality of fill limits. For example, the model compaction data can first be generated with a fill limit of 100 nanometers, then with a fill limit of 150 nanometers, and again with a fill limit of 200 nanometers. With each fill limit value increase, the reduction in corners from the previous fill limit value is computed. In embodiments, the fill limit that provides the maximum reduction of corners is selected for generation of the model compaction data to which the original context model generation is applied. Using the example above, if a fill limit of 150 nanometers provides the greatest reduction in corners, and extending the fill limit to 200 nanometers only provides a slight reduction in corners, then using a fill limit of 150 nanometers provides the benefit of corner reduction without being unnecessarily large and triggering more DRC issues than necessary. In embodiments, there are different fill limits for filling in the X dimensions and Y dimensions, and/or different fill limits for notched polygons and holed polygons.

Figure 12:
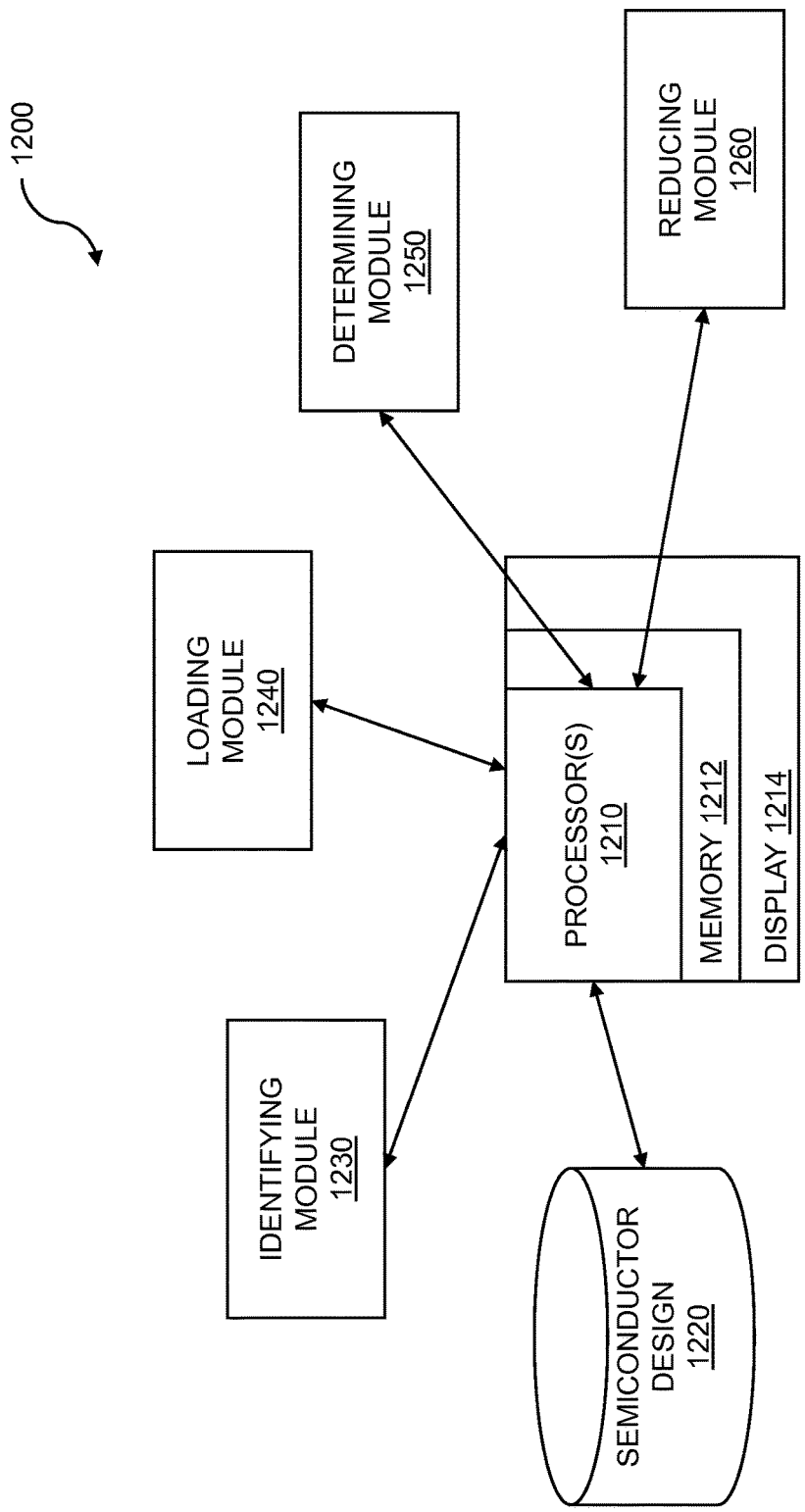
FIG. 12 shows a system for virtual cell model geometry compression.

FIG. 12 is a system diagram for virtual cell model geometry compression. The system 1200 is an embodiment of a computer system for design analysis. The system 1200 includes one or more processors 1210 which are coupled to a memory 1212. The memory 1212 can be used to temporarily or permanently store instructions, such as computer code, as well as calculated, temporary, partial, intermediate, and/or permanent computer data. The data can include any appropriate type or types of data including data for one or more semiconductor designs. The semiconductor design data can include cell information; hierarchical level information; layout information; layer information; mask information; optical information; design, configuration, and test data; test instructions, and so on. The data can include and describe various design levels. The data can include other types of data such as system support information, analysis results, etc. A display 1214 can also be present. The display 1214 can be any of a variety of electronic projectors, monitors, displays, and screens, including but not limited to, a computer display or screen, a laptop computer screen, a tablet screen, a smartphone display, a personal digital assistant (PDA) display, a handheld display, a remote display, a digital projector, or a digital television.

The system 1200 also includes a semiconductor design 1220. The semiconductor design can comprise a plurality of design levels. The semiconductor design 1220 can be stored in any appropriate storage device and medium including a hard disk drive (HDD), a solid-state drive (SSD), an optical disk drive (ODD), or another computer-readable storage medium. The semiconductor design can include descriptions of levels, hierarchies of levels, virtual hierarchical levels, descriptions of rectangles and polygons, and so on. An identifying module 1230 is also included in the system 1200. The identifying module can be used to identify a cell and multiple instances of the cell from a semiconductor design including a plurality of cells and a plurality of virtual hierarchical levels. The identified cell can be any of a variety of cells including analog cells, digital cells, logic cells, storage cells, processing cells, communication cells, and so on. The cell can be a parent cell, a child cell contained within a parent cell, a sibling cell to a cell contained within the parent cell, and so on. The system 1200 also includes a loading module 1240 which can be used to load virtual hierarchical layer (VHL) data based on the cell and obtain a virtual cell model, representative of the cell. The VHL data can include polygons and partial polygons. The polygons and partial polygons can include rectangles, rhombi, trapezoids, complex polygons, and any other shape appropriate to the semiconductor design. A determining module 1250 which can be used to determine interactions between data within the cell and the VHL data and to select relevant portions of shapes based on the determining is also included in the system 1200. The interactions between the data within the cell and the VHL data can include overlapping of polygons and portions of polygons. The interactions can be determined for multiple VHLs. The system 1200 also includes a reducing module 1260 which can be used to reduce an amount of data within the virtual cell model based on the interactions which were determined. The reducing can include compression of the virtual cell model geometry. The compression can result in reduced computational resource requirements, for example. The reducing can include removing redundant information from the virtual cell model. In at least one embodiment, functions of the identifying module 1230, the loading module 1240, the determining module 1250, and/or the reducing module 1260 are accomplished or augmented by the one or more processors 1210.

The system 1200 can include a computer program product for design analysis. The computer program product can be embodied in a non-transitory computer readable medium and can comprise code for identifying a cell and multiple instances of the cell from a semiconductor design including a plurality of cells and a plurality of virtual hierarchical levels; code for loading virtual hierarchical layer (VHL) data based on the cell; code for obtaining a virtual cell model, representative of the cell; code for determining interactions between data within the cell and the VHL data and selecting relevant portions of shapes based on the determining; and code for reducing an amount of data within the virtual cell model based on the interactions which were determined.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for generating and analyzing a layout of a semiconductor integrated circuit design, the method comprising:

identifying a cell and multiple instances of the cell from the semiconductor design layout including a plurality of cells and a plurality of virtual hierarchical levels;

loading virtual hierarchical layer (VHL) data based on the cell;

obtaining a virtual cell model, representative of the cell;

determining interactions, between data within the cell and the VHL data, and selecting relevant portions of shapes based on the determining; and reducing an amount of data within the virtual cell model based on the interactions which were determined.

2. The method of claim 1 wherein the reducing further comprises removing shapes which are not part of the relevant portions.

3. The method of claim 2 wherein the removing reduces a number of corners included in the virtual cell model.

4. The method of claim 2 wherein the removing includes removing trapezoidal shapes which do not interact with the VHL data.

5. The method of claim 1 wherein the reducing further comprises adding to the relevant portions in order to reduce a number of corners within the virtual cell model.

6. The method of claim 5 wherein the adding retains correctness of the virtual cell model for representing the cell.

7. The method of claim 5 wherein the adding includes trapezoidal shapes.

8. The method of claim 5, wherein adding to the relevant portions comprises filling a notched polygon.

9. The method of claim 5, wherein adding to the relevant portions comprises filling a holed polygon.

10. The method of claim 1 wherein the relevant portions of the shapes interact with polygons in an overlapping cell.

11. The method of claim 1 wherein the relevant portions are used to resolve the interactions with a parent cell, an ancestor cell, a direct sibling cell, or an indirect sibling cell.

12. The method of claim 1 wherein the reducing further comprises removing fake portions of shapes from shapes in the virtual cell model.

13. The method of claim 12 wherein the fake portions of shapes are based on shape edges or shape corners, in an overlapping cell, being crossed by a shape in the cell.

14. The method of claim 1 wherein the obtaining the virtual cell model includes generating model data, based on interactions between data within the cell and the VHL data.

15. The method of claim 1 wherein the obtaining the virtual cell model includes creating an empty cell model comparable with the cell which was identified.

16. The method of claim 1, wherein loading virtual hierarchical layer (VHL) data comprises loading VHL data that includes power rails.

17. The method of claim 1, wherein determining interactions, between data within the cell and the VHL data, and selecting relevant portions of shapes based on the determining, further comprises:

identifying a plurality of input polygons interacting with a border of the identified cell to derive A-data;

identifying polygons within the VHL data that interact with the A-data to derive B-data;

subtracting the A-data from the B-data to derive C-data;

increasing a size of the C-data by a predetermined amount to derive D-data;

identifying polygons within the A-data that interact with the D-data to derive E-data;

increasing the size of the E-data towards a center of the cell to derive F-data;

subtracting the D-data from the F-data to derive G-data; and merging the G-data with input data to derive model compaction data.

18. The method of claim 17, further comprising deriving multiple instances of model compaction data using a plurality of fill limits, and selecting a model compaction data instance with a maximum reduction of corners.

19. A computer system for generating and analyzing a layout of a semiconductor integrated circuit design, the computer system comprising:
- a memory which stores instructions;
- one or more processors coupled to the memory wherein the one or more processors are configured to:
- identify a cell and multiple instances of the cell from the semiconductor design layout including a plurality of cells and a plurality of virtual hierarchical levels;
- load virtual hierarchical layer (VHL) data based on the cell;
- obtain a virtual cell model, representative of the cell;
- determine interactions, between data within the cell and the VHL data, and selecting relevant portions of shapes based on the determining; and
- reduce an amount of data within the virtual cell model based on the interactions which were determined.

20. A computer program product embodied in a non-transitory computer readable medium for generating and analyzing a layout of a semiconductor integrated circuit design, the computer program product comprising:
- code for identifying a cell and multiple instances of the cell from the semiconductor design layout including a plurality of cells and a plurality of virtual hierarchical levels;
- code for loading virtual hierarchical layer (VHL) data based on the cell;
- code for obtaining a virtual cell model, representative of the cell;
- code for determining interactions, between data within the cell and the VHL data, and selecting relevant portions of shapes based on the determining; and
- code for reducing an amount of data within the virtual cell model based on the interactions which were determined.

* * * * *